United States Patent [19]
Belt et al.

[11] Patent Number: 5,866,093
[45] Date of Patent: Feb. 2, 1999

[54] METHOD OF PREPARING LIPF$_6$

[75] Inventors: Heinz-Joachim Belt, Burgwedel; Dirk Seffer, Neustadt; Werner Rudolph, Hanover, all of Germany

[73] Assignee: Solvay Fluor und Derivate GmbH, Hanover, Germany

[21] Appl. No.: 880,510

[22] Filed: Jun. 23, 1997

[30] Foreign Application Priority Data

Jun. 26, 1996 [DE] Germany .................. 196 25 448.5

[51] Int. Cl.$^6$ .................................................. C01B 25/10
[52] U.S. Cl. ............................................................ 423/301
[58] Field of Search ............................................. 423/301

[56] References Cited

U.S. PATENT DOCUMENTS

| | | |
|---|---|---|
| 3,607,020 | 9/1971 | Smith . |
| 3,907,977 | 9/1975 | Wiesbock . |
| 4,880,714 | 11/1989 | Bowden . |
| 5,378,445 | 1/1995 | Salmon et al. . |
| 5,427,874 | 6/1995 | Sugeno et al. . |

FOREIGN PATENT DOCUMENTS

| | | |
|---|---|---|
| 643433 | 3/1995 | European Pat. Off. . |
| 662729 | 7/1995 | European Pat. Off. . |
| 196 14 503 | 10/1996 | Germany . |
| 251109 | 12/1985 | Japan . |

OTHER PUBLICATIONS

A.A. Opalovsky et al, "Synthesis and Purification of Potassium Hexafluorophosphate," Ada Univ. Szeged Ada Phys. & Chem. (Hungary), vol. 23, No. 2–3 (1977), pp. 305–311.
Abstract of Published Japanese Patent Application No. Jp 86–031393.
Abstract of Published Japanese Patent Application No. JP 93–374327.
Abstract of Published Japanese Patent Application No. JP 92–256415.
Brauer, *Handbuch der Praeparativen Anorganischen Chemie* (Handbook of Preparative Inorganic Chemistry), vol. 1, p. 215, Ferdinand Enke Verlag, Stuttgart (1975).
Abstract of Published Japanese Patent Application No. JP 60–251109 and Koyama et al., "Lithium hexafluorophosphate", *Chemical Abstracts*, No. 104:132424s.

*Primary Examiner*—Wayne Langel
*Attorney, Agent, or Firm*—Evenson, McKeown, Edwards & Lenahan, P.L.L.C.

[57] ABSTRACT

A method for preparing lithium hexafluorophosphate, which is useful as an electrolyte in primary and secondary cells, involves combining and cooling phosphorus pentachloride and lithium fluoride, and then adding hydrogen fluoride. Using this method, which is simple to perform, a good yield of the product can be obtained.

13 Claims, No Drawings

METHOD OF PREPARING LiPF$_6$

BACKGROUND OF THE INVENTION

The invention relates to a method for the preparation of lithium hexafluorophosphate by reaction of phosphorus pentachloride, lithium fluoride and hydrogen fluoride.

Lithium hexafluorophosphate can be used as an electrolyte in primary and secondary cells. Such cells comprise an anode, a cathode and an electrolyte, which is dissolved in an aprotic, non-aqueous solvent. Primary cells cannot be recharged. Such a primary cell is disclosed, for example, in U.S. Pat. No. 3,546,022 (=DE-OS 1,935,941). The primary cell described therein comprises a sodium anode and a cathode containing elemental sulfur. The lithium hexafluorophosphate used as the electrolyte is dissolved in a polyether solvent.

Secondary cells are described in U.S. Pat. No. 5,427,874. Carbon material which is doped with lithium is used as the anode, and, for example, mixed oxides of lithium and cobalt are used as the cathode. Among other things, lithium hexafluorophosphate can be used as the electrolyte, and certain pyrocarbonates (anhydrides of carboxylic acid esters) are used as solvents.

U.S. Pat. No. 4,880,714 (=EP 385,724) also discloses electrochemical cells with lithium hexafluorophosphate electrolyte. The lithium-containing electrolyte is used in a solvent mixture of propylene carbonate and dimethoxyethane. The problem is that lithium hexafluorophosphate is unstable in its pure form. Furthermore, it is strongly hygroscopic, so that it is not easy to prepare. For this reason, U.S. Pat. No. 4,880,714 proposes a method for preparing lithium hexafluorophosphate in which the salt of a Lewis base and hexafluorophosphoric acid is reacted with a lithium base. The reaction, for example, of ammonium hexafluorophosphate and lithium hydride, is performed in a complexing solvent such as 1,2-dimethoxyethane, and the resulting complex of lithium hexafluorophosphate and two molecules of 1,2-dimethoxyethane is precipitated and can be isolated.

SUMMARY OF THE INVENTION

It is an aim of the present invention to provide a simple, readily performable method for the preparation of lithium hexafluorophosphate.

This and other aims are achieved in accordance with the present invention by providing a method for preparing LiPF$_6$ comprising combining and cooling PCl$_5$ and LiF, and thereafter adding HF in an amount at least stoichiometrically sufficient for complete chlorine-fluorine exchange in the PCl$_5$, whereby a reaction mixture comprising LiPF$_6$ is formed by reaction of the PCl$_5$, LiF and HF.

According to the invention, the preparation of lithium hexafluorophosphate is effected by reaction of phosphorus pentachloride, lithium fluoride and hydrogen fluoride, in which phosphorus pentachloride and lithium fluoride are combined, cooled and hydrogen fluoride is added in at least the quantity required stoichiometrically for the chlorine-fluorine exchange in the phosphorus pentachloride.

The cooling is thereby intended to keep the reaction from becoming too vigorous. Depending on the cooling, the HF can be added more quickly. If the reaction mixture is cooled, for example, to −40° C., HF can be added more quickly than if it is only cooled to −10° C. In principle, the reaction—with an appropriately slow addition of HF—can be carried out when cooling only to 0° C. or even higher temperatures.

The LiF can also be prepared in situ, e.g. from Li halides, such as LiCl or LiBr, or from Li$_2$CO$_3$. Then correspondingly more HF is used.

The molar ratio of phosphorus pentachloride to lithium fluoride is advantageously in the range from 1:1 to 2:1. Particularly good results are achieved if the molar ratio of phosphorous pentachloride to lithium fluoride is in the range of 1.2:1 to 1.3:1.

It is advantageous to use a stoichiometric excess of hydrogen fluoride. Particularly favorable results can be obtained if the molar ratio of HF to PCl$_5$ is at least 5:1, preferably 7:1 to 9:1. The excess of hydrogen fluoride acts as a solvent. An HF excess up to a molar ratio of HF to PCl$_5$ of 15:1 can be used with good results. Additional HF can be added as a solvent.

What is surprising is that in accordance with the method of the invention, the entire amounts of phosphorus pentachloride and of lithium fluoride can be effectively combined and then caused to react with hydrogen fluoride. The required cooling is intended to prevent the reaction, which begins vigorously, from maintaining its initial vigor throughout the entire reaction time. It is advantageous to cool the phosphorus pentachloride and lithium fluoride, which have been combined, to a temperature below −50° C. This can be done by immersing the reaction vessel in appropriately temperature-controlled freezing mixtures. Usually cryomats set to a temperature of below −50° C. are used. Advantageously, the reaction mixture consisting of phosphorus pentachloride, lithium fluoride and hydrogen fluoride is cooled to a temperature below −50° C. at least until the addition of the hydrogen fluoride is completed, by contacting the reaction vessel, for example an autoclave, with the cooling liquid cooled to a temperature of below −50° C. The vigor of the reaction which initially commences can result in the reaction mixture itself warming to temperatures above the aforementioned advantageous limit of −50° C. The addition of HF cooled to below −50° C. is advantageous.

Preferably the reaction and a post-reaction phase are carried out in an open system. This will be explained further below.

It has proved advantageous to allow the reaction mixture to react fully while being cooled, preferably to a temperature of below −50° C., after the addition of the hydrogen fluoride has been completed. This may take place over a time period of, for example, 5 minutes up to one hour, or more.

Furthermore, it has proved advantageous to regulate the temperature of the coolant to 0° to 15° C. in order to carry out a post-reaction phase, especially in the open system. The reaction mixture also heats up correspondingly, advantageously to the temperature of 0° to 15° C. At this preferred temperature, the reaction mixture can be allowed to undergo a post-reaction phase for several more hours, for example 5 hours up to 30 hours. This can be effected while the un-pressurized autoclave is being flushed with inert gas, e.g. N$_2$ or Ar.

Any volatile constituents which may be present can be removed from the reaction product in a vacuum. If desired, recrystallization and filtration are possible.

The method according to the invention enables the preparation of lithium hexafluorophosphate in simple manner (because a liquid is added to a mixture of solids) in good yield and in high purity. The crystalline product can be ground, in order to subsequently remove any HF inclusions under vacuum.

The following example is intended to illustrate the invention in greater detail, without restricting its scope.

EXAMPLE

Preparation of LiPF$_6$ from LiF, PCl$_5$ (25% excess) and HF (temperature controlled to −78° C.).

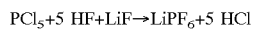

General

The example was carried out in a laboratory autoclave (volume 300 ml; permissible operating pressure 100 bar) manufactured by Roth. The reactor contents were mixed thoroughly with a magnetically-coupled stirrer. The temperature control was effected using methanol, which was temperature-controlled by two cryomats. An additional solvent (in addition to the excess HF) was not used.

Starting material quantities:
Hydrogen fluoride: 160.0 g=8 mole
Total excess: 122.5 g=(also acts as solvent)
Lithium fluoride: 7.8 g=0.30 mole
Phosphorus pentachloride: 78.2 g=0.375 mole/25% excess
(Excess calculated relative to LiF in each case)

Procedure:

The phosphorus pentachloride was mixed together with the lithium fluoride by shaking in a polyethylene flask and then was metered into the autoclave.

The metering of the hydrogen fluoride which was cooled to −78° C. took a total of 6 minutes. Once the addition of the hydrogen fluoride had ended, stirring was continued for another 6 hours with parallel flushing with nitrogen in the "open system". Then the cryomat was set to 10° C. Stirring was continued for another 17 hours while flushing with nitrogen. The total reaction time was 23 hours, 6 minutes (calculated from the addition of the hydrogen fluoride). The final temperature was 11.4° C.

The excess hydrogen fluoride was withdrawn in the liquid state. The resulting crystals were washed with 10 ml of cold hydrogen fluoride and filtered out.

The solid thereafter was dried in a vacuum. During the subsequent removal of the product in the glovebox with nitrogen flushing, no fuming due to the hydrogen fluoride occurred. The product was dry. It had a white appearance. It was then ground in a mortar in the glovebox.

The yield was 39.6 g=0.26 mole=87% relative to LiF.

| Elemental analysis ($LiF_6P$) | | |
|---|---|---|
| | theoretical | found |
| Li | 4.6% | 4.6% |
| F | 75.0% | 75.9% |
| P | 20.4% | 19.6% |

The resulting substance was lithium hexafluorophosphate. The desired product was detected by its infrared (IR) spectrum.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for preparing $LiPF_6$, said method comprising forming a mixture of solids by combining and cooling $PCl_5$ and LiF, and thereafter adding liquid HF to said mixture of solids in an amount at least stoichiometrically sufficient for complete chlorine-fluorine exchange in the $PCl_5$, whereby a reaction mixture comprising $LiPF_6$ is formed by reaction of the $PCl_5$, LiF and HF.

2. A method according to claim 1, wherein the $PCl_5$ and LiF are combined in a molar ratio of $PCl_5$ to LiF of 1:1 to 2:1.

3. A method according to claim 2, wherein the $PCl_5$ and Lif are combined in a molar ratio of $PCl_5$ to Lif of 1.2:1 to 1.3:1.

4. A method according to claim 1, wherein the molar ratio of HF to $PCl_5$ is 5:1 to 15:1.

5. A method according to claim 4, wherein the molar ratio of HF to $PCl_5$ is 7:1 to 9:1.

6. A method according to claim 1, wherein the $PCl_5$ and LiF which are combined are cooled to a temperature of below −50° C.

7. A method according to claim 6, wherein the reaction mixture of $PCl_5$, LiF and HF is cooled to a temperature of below −50° C. at least until the HF has been completely added.

8. A method according to claim 1, wherein the reaction mixture is allowed to come to a temperature of 0° to 15° C.

9. A method according to claim 8, wherein the reaction of $PCl_5$, LiF and HF is carried out in a closed autoclave.

10. A method according to claim 8, wherein the reaction of $PCl_5$, LiF and HF is carried out in an open system.

11. A method according to claim 7, wherein after the addition of HF is complete, the reaction mixture is allowed to react while being cooled.

12. A method according to claim 1, wherein after the addition of HF is complete, the reaction mixture is allowed to react while being cooled to a temperature of below −50° C., and the reaction mixture is thereafter allowed to come to a temperature of 0° to 15° C. and subjected to a post-reaction phase while being flushed with inert gas.

13. A method according to claim 1, wherein hydrogen fluoride in excess of the amount stoichiometrically required for complete chlorine-fluorine exchange with the $PCl_5$ is added as a solvent.

* * * * *